UNITED STATES PATENT OFFICE.

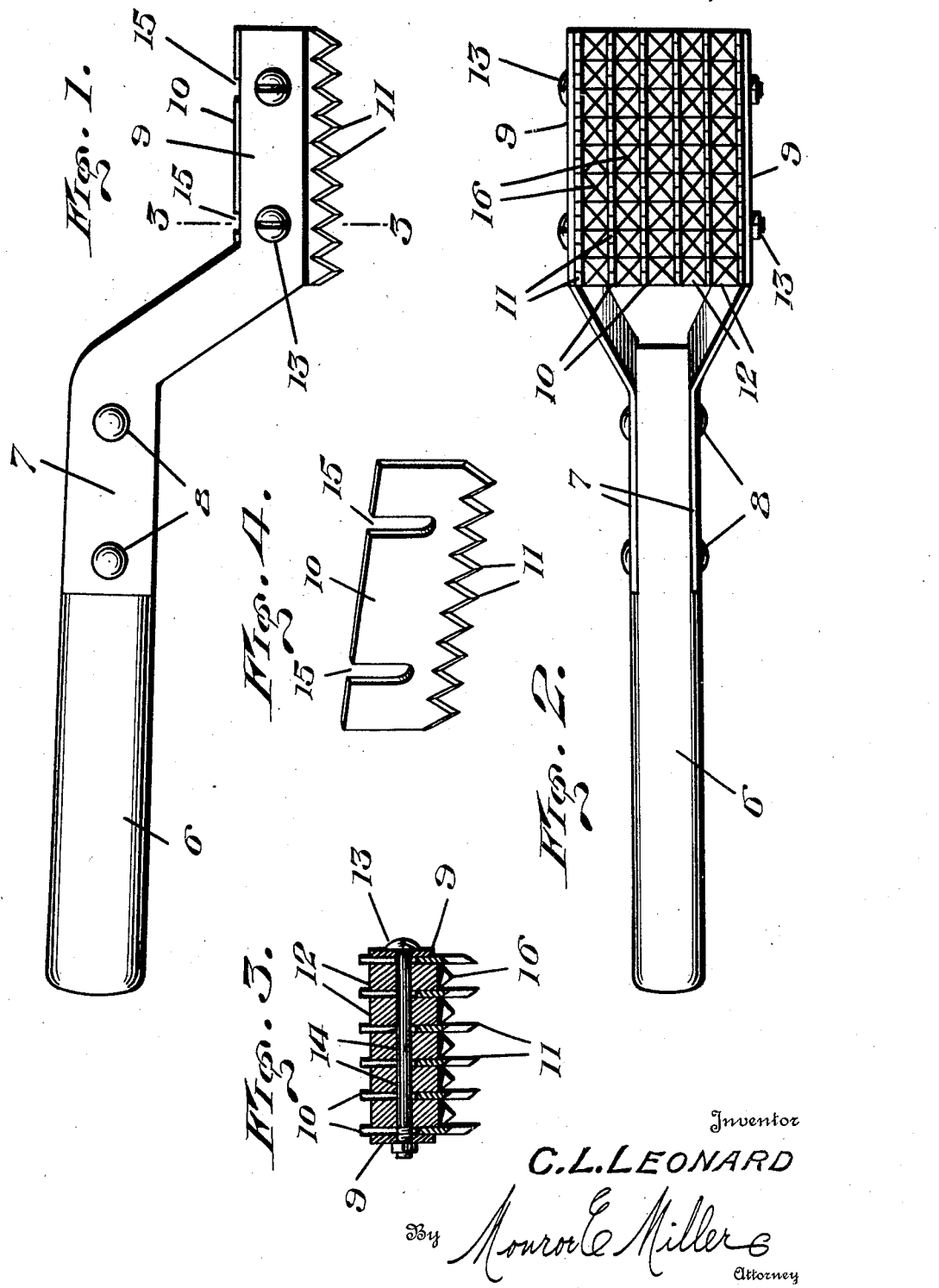

CASWELL L. LEONARD, OF CORINTH, MISSISSIPPI.

MEAT TENDERER.

1,402,778.  Specification of Letters Patent.  Patented Jan. 10, 1922.

Application filed August 13, 1920. Serial No. 403,263.

*To all whom it may concern:*

Be it known that I, CASWELL LEE LEONARD, a citizen of the United States, residing at Corinth, in the county of Alcorn and State of Mississippi, have invented certain new and useful Improvements in Meat Tenderers, of which the following is a specification, reference being had therein to the accompanying drawing.

The present invention relates to a meat tenderer, and aims to provide a novel and improved device of that character, which is of novel and improved, yet simple and inexpensive construction, for conveniently and efficiently beating or pounding steak or other meat to render the same more tender and digestible.

Another object is the provision of such a device comprising a novel head having means for cutting or chopping the meat and means, in addition thereto, for pounding or mashing the meat as well as regulating the depth of the cuts.

A further object is the provision of a meat tenderer having adjustable cutting or chopping blades, which can be adjusted to regulate the depth of cuts made, and which can also be readily removed for sharpening or replacement, when dull or worn out.

A still further object is the provision of such an implement having members between the cutting blades which serve as weights for the head, as spacers for separating the cutter blades, and also as means for mashing or bruising the surface of the meat between the cuts made.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of the implement.

Fig. 2 is a bottom view thereof.

Fig. 3 is a cross section of the head taken on the line 3—3 of Fig. 1.

Fig. 4 is a perspective view of one of the cutter or chopping blades.

A handle 6 of wood or other suitable material is employed for manipulating the device, and a pair of bars 7 is secured to one end portion thereof at opposite sides by means of rivets 8, or the like. These bars project beyond the end of the handle, and their free end portions are offset to one side of the axis of the handle, or downwardly in the normal horizontal position of the handle when in use for pounding meat on a horizontal surface.

The head of the implement is disposed between the portions 9 of the bars 7, and said portions are separated or offset away from one another to accommodate the head, and can be bent toward or away from one another in making the head narrower or wider by the removal of or addition to the elements of the head. This head comprises parallel spaced cutting or chopping blades 10, having their lower or active edges serrated to provide the cutting or chopping teeth 11, which have their edges beveled on one side, so that they can be readily sharpened from time to time when the blades are removed. The head has elongated spacer members 12 between the blades 10, said members also serve as weights for the head, to give the head sufficient heft for convenience in pounding the meat. The blades 10 and members 12 are secured together between the portions 9 by means of transverse bolts 13, or the like, extending through said portions 9, blades 10 and members 12, to clamp said parts together. The members 12 have apertures 14 for the passage of the bolts, while the blades 10 have vertical or transverse slots 15 for the passage of the bolts extending to the upper edges of the blades, or those edges opposite to the serrated or toothed edges. Thus, by loosening the bolts 13, the blades 10 can be adjusted upwardly and downwardly for projecting or retracting the teeth 11 thereof with respect to the lower edges of the members 12, to regulate the depth of the cuts made in the meat, said members 12, in contacting with the meat, limiting the movement of the teeth into the meat. Furthermore, the blades 10 can also be withdrawn from the members 12, when the bolts 13 are loosened, for sharpening the teeth, and can then be readily slipped back into place and adjusted, whereby the teeth 11 project more or less beyond the lower edges of the members 12. Said lower edges of the members 12 have longitudinal series of pyramidal points or teeth 16, which, in contacting with the surface of the meat, will mash or bruise same, between the cuts made by the cutting teeth 11, to thereby soften the meat and make it more tender.

Having thus described the invention, what is claimed as new is:—

1. An implement of the character described comprising a handle, bars extending from one end of the handle and having their free end portions offset to one side of the axis of the handle, a head having toothed members disposed side by side between said offset portions, and means for clamping said portions and members together.

2. An implement of the character described comprising a head having spaced blades with cutting edges and spacer members between the blades for limiting the depth of cuts made by said edges, said blades being adjustable to project or retract said edges thereof with respect to said spacer members.

3. An implement of the character described comprising said blades having cutting edges, spacer members between said blades for separating them and limiting the cuts made by said edges, bolts for clamping said blades and members together, said blades having slots for the reception of said bolts to enable the blades to be adjusted for projecting or retracting the cutting edges thereof with respect to said members.

4. An implement of the character described comprising a handle, a pair of bars projecting therefrom, a head disposed between said bars and including spaced blades and spacer members between the blades, and bolts extending through said bars, blades and members for clamping them together, said blades having serrated cutting edges projecting from said members and the blades having slots receiving said bolts and extending to the opposite edges thereof for the adjustment of blades to project and retract said cutting edges, and the corresponding edges of said members having bruising teeth.

In testimony whereof I hereunto affix my signature.

CASWELL L. LEONARD.